United States Patent
Embree et al.

(10) Patent No.: US 7,317,957 B1
(45) Date of Patent: Jan. 8, 2008

(54) MEMORY ALLOCATION FOR REAL-TIME AUDIO PROCESSING

(75) Inventors: Paul Michael Embree, Irvine, CA (US); Jeffrey Mark Claar, Aliso Viejo, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 08/936,344

(22) Filed: Sep. 24, 1997

(51) Int. Cl.
*G06F 17/00* (2006.01)
*G06F 12/00* (2006.01)

(52) U.S. Cl. ................................ 700/94; 711/165

(58) Field of Classification Search ........... 364/400.01; 386/96; 348/926; 381/119, 1, 2; 700/94; 710/269; 370/85.11
See application file for complete search history.

(56) References Cited

U.S. PATENT DOCUMENTS

| | | | |
|---|---|---|---|
| 4,636,942 A | * | 1/1987 | Chen et al. ................ 710/269 |
| 5,194,996 A | * | 3/1993 | Shores ........................ 360/48 |
| 5,273,050 A | * | 12/1993 | Schaus et al. .............. 128/702 |
| 5,313,339 A | * | 5/1994 | Fukami et al. .............. 386/102 |
| 5,392,252 A | * | 2/1995 | Rimpo et al. ........... 365/230.02 |
| 5,577,044 A | * | 11/1996 | Oxford .................... 370/85.11 |
| 5,625,570 A | * | 4/1997 | Vizireanu et al. ............. 386/96 |
| 5,689,438 A | * | 11/1997 | Goh ........................... 348/426 |
| 5,758,177 A | * | 5/1998 | Gulick et al. .................. 712/1 |

FOREIGN PATENT DOCUMENTS

JP 6-232664 * 8/1994
WO WO 90/07184 A1 6/1990

OTHER PUBLICATIONS

Chang et al., IBM Technical Disclosure Bulletin, Mar. 1991, US, p. 1-6.*

* cited by examiner

*Primary Examiner*—Xu Mei
(74) *Attorney, Agent, or Firm*—Blakely, Sokoloff, Taylor & Zafman LLP

(57) ABSTRACT

The present invention is a method and apparatus for allocating real-time audio data from a plurality of audio channels in a system having a first processor and a second processor. Memory banks are provided where each memory bank is accessible to the first and second processors. Subsets of the audio data are stored in the memory banks. These subsets correspond to different groups of audio channels.

13 Claims, 6 Drawing Sheets

MEMORY ALLOCATION FOR REAL-TIME AUDIO PROCESSING

BACKGROUND OF THE INVENTION

1. Field of the Invention

The present invention relates to memory allocation for real-time audio processing. In particular, the present invention relates to DRAM bank switching for real-time audio data storage.

2. Description of Related Art

Real-time audio signal processing requires fast access time. In a typical audio system, there are general-purpose processor and specialized digital signal processor (DSP). The general purpose or host processor is any general central processing unit (CPU) such as those in a personal computer (PC). The host processor usually performs data storage, user interface, network control, and other general command and house keeping functions. The host processor also has interfaces to peripheral devices such as serial communication, disk controllers (e.g., a hard disk controller). The DSP usually performs signal processing functions to process real-time audio data such as digital filtering. Multiple and separate memory banks are accessible to both the host processor or other direct memory access (DMA) devices such as a SCSI controller.

Real-time audio signal processing usually involves three basic operational modes: recording, playback, and editing.

During the recording mode, the audio data are sent from audio input channels and stored in random access memories (RAMs) by the DSP. The audio data are subsequently transferred to a storage device such as a hard disk drive via the SCSI controller.

During the playback mode, the audio data stored in the hard disk drive are first transferred to random access memory (RAM) via the SCSI controller. The DSP then accesses the RAM to process the audio data and output to the appropriate audio output channels.

The RAM is typically organized as multiple memory banks which are accessible to both the DSP and the SCSI controller. Traditional techniques involve transferring data to fill up a memory bank before going to the next memory bank. However, if a memory bank is busy for receiving data, it will not be immediately accessible to the DSP, resulting in processing delay.

Accordingly, there is a need to provide an apparatus and method for efficient memory allocation for real-time audio signal processing.

SUMMARY OF THE INVENTION

The present invention discloses a method for allocating real-time audio data from N audio channels in a system having a first processor and a second processor. The method comprises the steps of: (1) providing P memory banks where each memory bank is accessible to the first and second processors; and (2) storing P subsets of the audio data in P memory banks, respectively, where the P subsets correspond to P different groups of audio channels.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method for efficient memory allocation to reduce memory waiting time in a real-time audio signal processing system. The memory is divided into separate memory banks for independent accesses by the host processor and the digital signal processor (DSP). The audio samples are stored in the memory banks in an interleaving manner to distribute the memory access over multiple memory banks. This memory allocation allows a small computer system interface (SCSI) controller and the DSP equal access to the memory banks.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
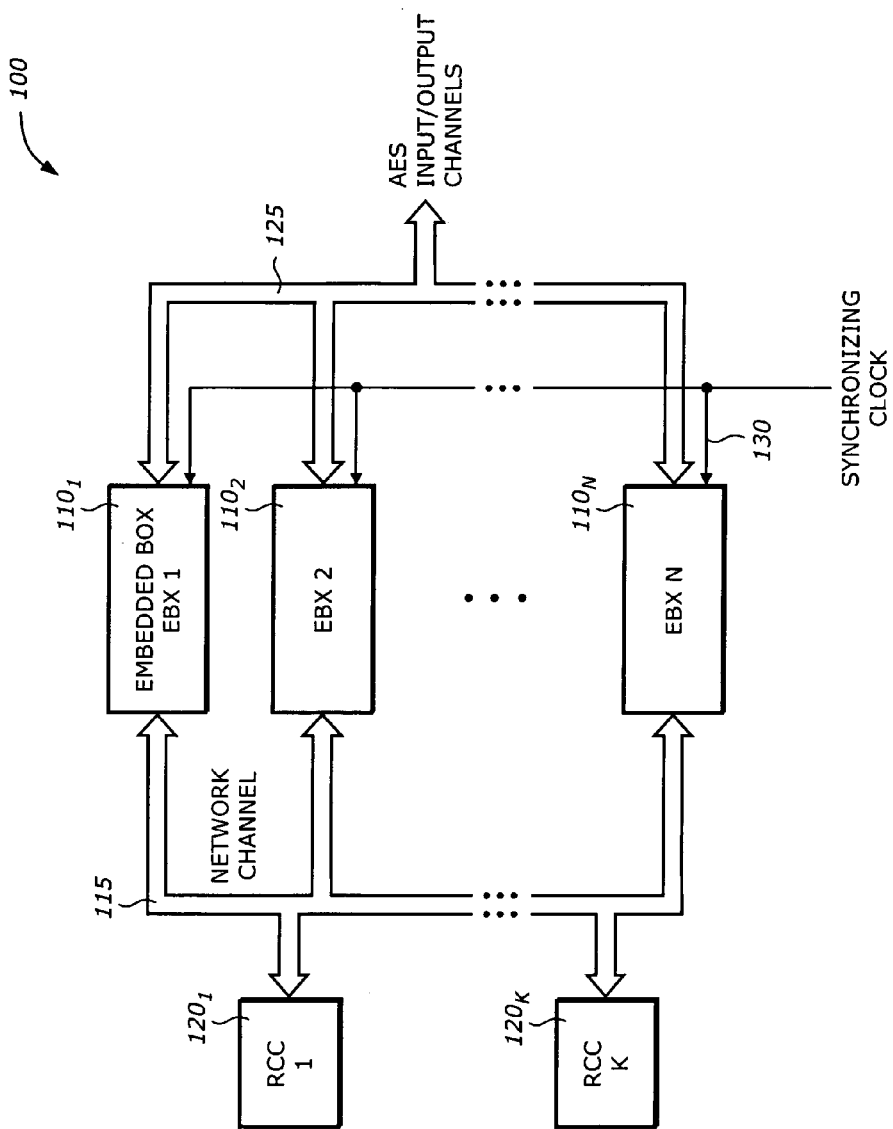
FIG. 1 is a block diagram illustrating one embodiment of an audio player/recorder system that operates in accordance with the teachings of the present invention.

Referring to FIG. 1, a block diagram illustrating one embodiment of an audio player/recorder system 100 that operates in accordance with the teachings of the present invention is shown. The system 100 comprises embedded boxes (EBX) EBX1 through EBXN $110_1$ through $110_N$ ("N" being a whole positive number), K remote client computers (RCCs) $120_1$ through $120_K$ ("K" being a positive whole number), network channel 115, audio engineering society (AES) standard input/output channels 125, and synchronizing clock 130.

Each of the EBX $110_1$ through $110_N$ is an audio signal processing system with mass storage. In one embodiment, each EBX includes a personal computer (PC) system and one or more digital signal processors (DSPs). Other configurations that provide similar functionalities are also contemplated. Audio sampled data are stored in multiple dynamic random access memory (DRAM) banks. These DRAM banks are accessible to both the host processor of the PC and the DSPs. The details of the EBX architecture will be discussed later.

Each of the RCC's $120_1$ through $120_K$ provides graphical user interface (GUI) to users for sending command and control information to the EBXes $110_1$ through $110_N$ over the network channel 115. Each RCC has two modes of communication with the EBXes: individual addressing and broadcasting. In individual addressing, the RCC issues the command/control information to the specified EBX. The individual address of the destination is encoded as part of the command/control information.

The AES I/O channels 125 consist of 16 audio I/O channels per EBX conforming to the AES standard. The standard is AES 3-1992 and is available from the Audio Engineering Society, Inc., located in New York, N.Y. The synchronizing clock 130 provides a master timing signal for synchronizing all real-time activities of the EBXes $110_1$ through $110_N$.

Figure 2:
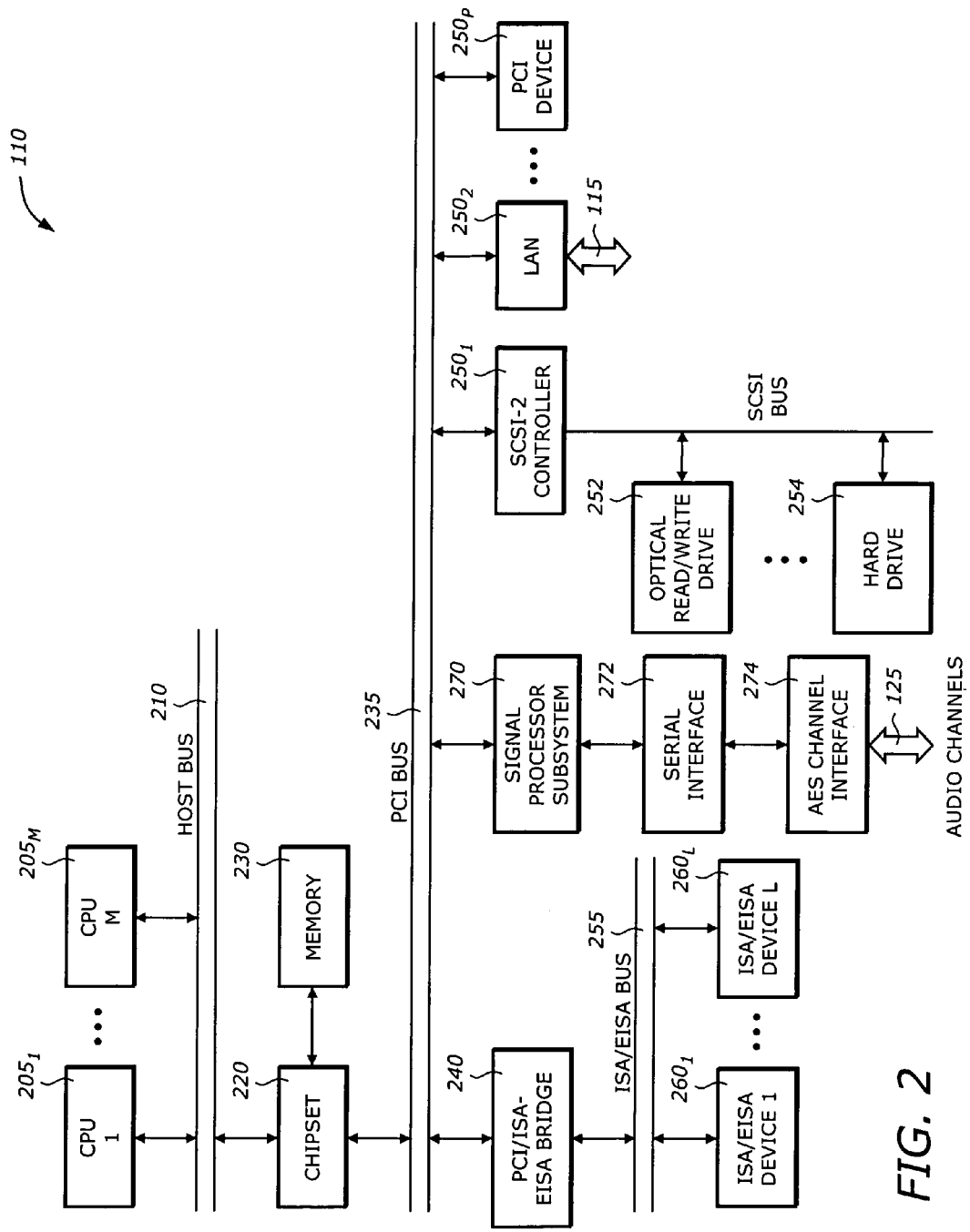
FIG. 2 is a diagram illustrating one embodiment of an embedded box in the audio player/recorder system.

Referring to FIG. 2, a block diagram illustrating one embodiment of the EBX 110 is shown. The EBX 110 comprises one or more processors $205_1$-$205_M$ ("M" being a positive whole number) and a main memory element 230 (e.g., dynamic random access memory "DRAM", static random access memory "SRAM" etc.) coupled together by a chipset 220. In general, the chipset 220 operates as an interface between a host bus 210 and a peripheral bus 235.

Processors $205_1$-$205_M$ are any microprocessors. In this embodiment, processors $205_1$-$205_N$ are the Pentium® or Pentium Pro® microprocessors manufactured by Intel Corporation at Santa Clara, Calif.

Chipset 220 typically includes cache DRAM controller (CDC), peripheral bus controller, and data path unit (DPU). The Peripheral Component Interconnect (PCI) Bridge (PB) provides a set of host-to-PCI and PCI-to-host bus transaction translations.

The host bus 210 is a bus that can support transactions to a number of connected processors. Host bus 210 may be referred to as a parallel bus or multiprocessor bus because it supports parallel operations and multiple processors. It is contemplated that host bus 210 operates in a pipelined manner to increase efficiency. However, these features should not be construed to limit the teachings of the present invention. The present invention can be utilized even if there is only one processor connected to the host bus 210, or the host bus 210 is a uniprocessor bus.

The peripheral bus 235 provides a communication path between the processors $205_1$-$205_M$ or main memory element 230 and a plurality of peripheral devices $250_1$-$250_P$ ("P" being a positive whole number). These peripheral devices $250_1$-$250_P$ may include I/O devices such as disk controller $250_1$, local area network (LAN) card $250_2$. In one embodiment, the disk controller $250_1$ is a small computer system interface (SCSI)-2 controller which is interfaced to a number of mass storage devices such as optical read/write drive 252 and hard drive 254, through the SCSI-2 bus. Relevant to the present invention is the signal processing subsystem (SPS) 270 which includes digital signal processors (DSPs), multiple dynamic random access memory (DRAM) banks and PCI bus interface circuits. The SPS 270 has interface to the serial input/output communication device 272 which is connected to the AES I/O channel interface 274. The peripheral bus 235 may include a Peripheral Component Interconnect (PCI) bus or any other type of bus architecture.

The expansion bus 255 provides a communication path between the peripheral bus 235 and a plurality of expansion peripheral devices $260_1$-$260_L$ ("L" being a positive whole number). The expansion bus 255 may include an Industry Standard Architecture (ISA) bus or an Extended Industry Standard Architecture (EISA) bus.

The PCI-to-ISA/EISA Bridge 240 provides the communication path between the peripheral or PCI bus 235 and the expansion or ISA/EISA bus 255.

The term PCI processor refers to a processor that can have control of the PCI bus for data transfers. A # symbol after a signal name indicates an active LOW signal. The absence of such symbol indicates an active HIGH signal. The notation 0x refers to a hexadecimal notation.

The SPS 270 includes one or more digital signal processors (DSPs) and a number of memory banks. The SPS 270 includes a memory system 300 that operates in accordance with the teachings of the present invention.

Figure 3:
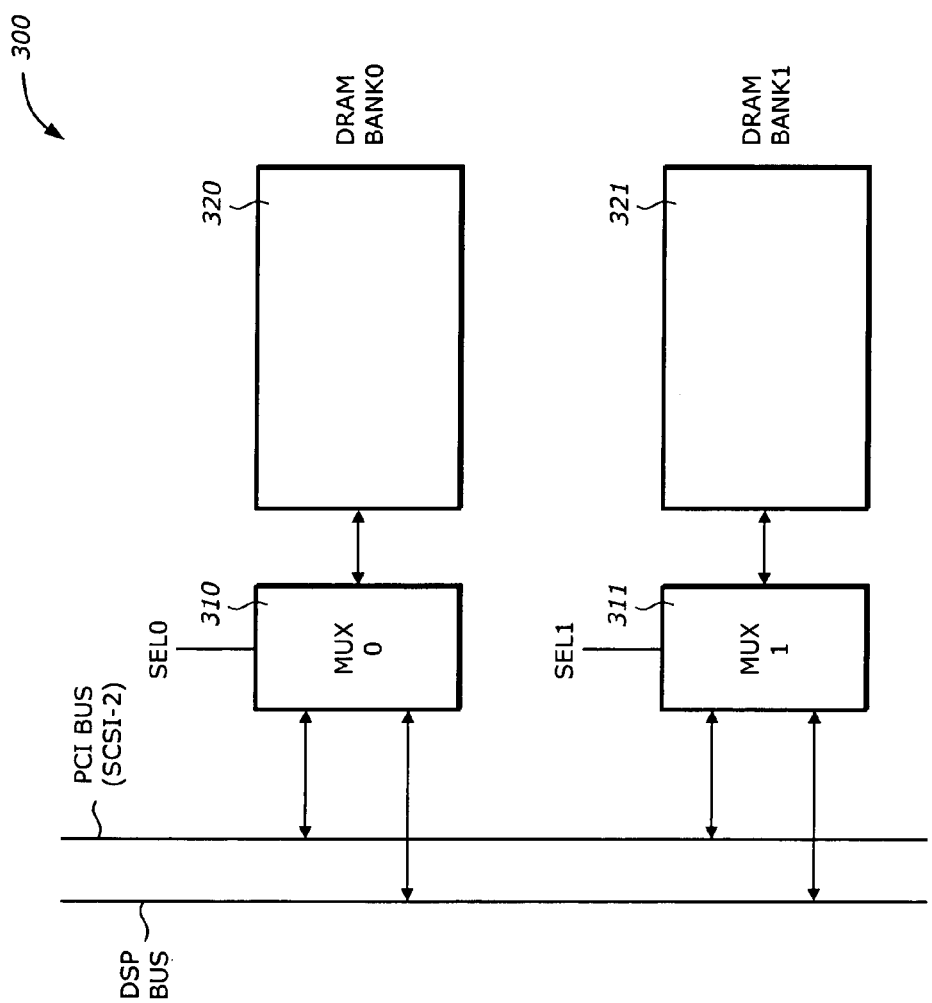
FIG. 3 is a diagram illustrating one embodiment of memory banks.

Referring to FIG. 3, a block diagram illustrating one embodiment of the memory system 300 is shown. Memory system 300 comprises two 2-to-1 multiplexers MUX0 310 and MUX1 311 and two memory banks DRAM BANK0 and DRAM BANK1 320 and 321. As will be explained later, a system having N memory banks can be used with N 2-to-1 multiplexers.

MUX0 310 and MUX1 311 are 2-to-1 multiplexers connected to the DSP bus and the PCI bus (for SCSI access) and to the DRAM BANK0 320 and DRAM BANK1, respectively. Each of the MUX0 310 and MUX1 311 conceptually consists of two multiplexers: address multiplexer (unidirectional) and data multiplexer (bi-directional). For clarity, only one multiplexer is shown and the direction is shown to be bi-directional. In the present embodiment, the multiplexers are realized by the bi-directional switches Part No. QS3257 or similar devices manufactured by Quality Semiconductor (Santa Clara, Calif.).

MUX0 310 and MUX1 311 are controlled by the SEL0 and SEL1 signals, respectively. When SEL0 and SEL1 are at a first logic level (e.g., LOW), the data transfer is between the selected DRAM bank and the PCI bus (SCSI controller). When SEL0 and SEL1 are at a second logic level (e.g., HIGH), the data transfer is between the selected DRAM bank and the DSP bus.

DRAM BANK0 320 and DRAM BANK1 321 are two dynamic random access memory (DRAM) banks operating separately and independently. As is well known by one skilled in the art, other types of memory such as static RAM can also be used. In one embodiment, each DRAM bank is organized as 4M×32 or 16 Mbytes.

By controlling the SEL0 and SEL1, the two DRAM banks can be accessed simultaneously by two different processors. For example, the SCSI controller may access DRAM BANK0 320 for storing data while the DSP is reading the data out from DRAM BANK1 321.

Figure 4:
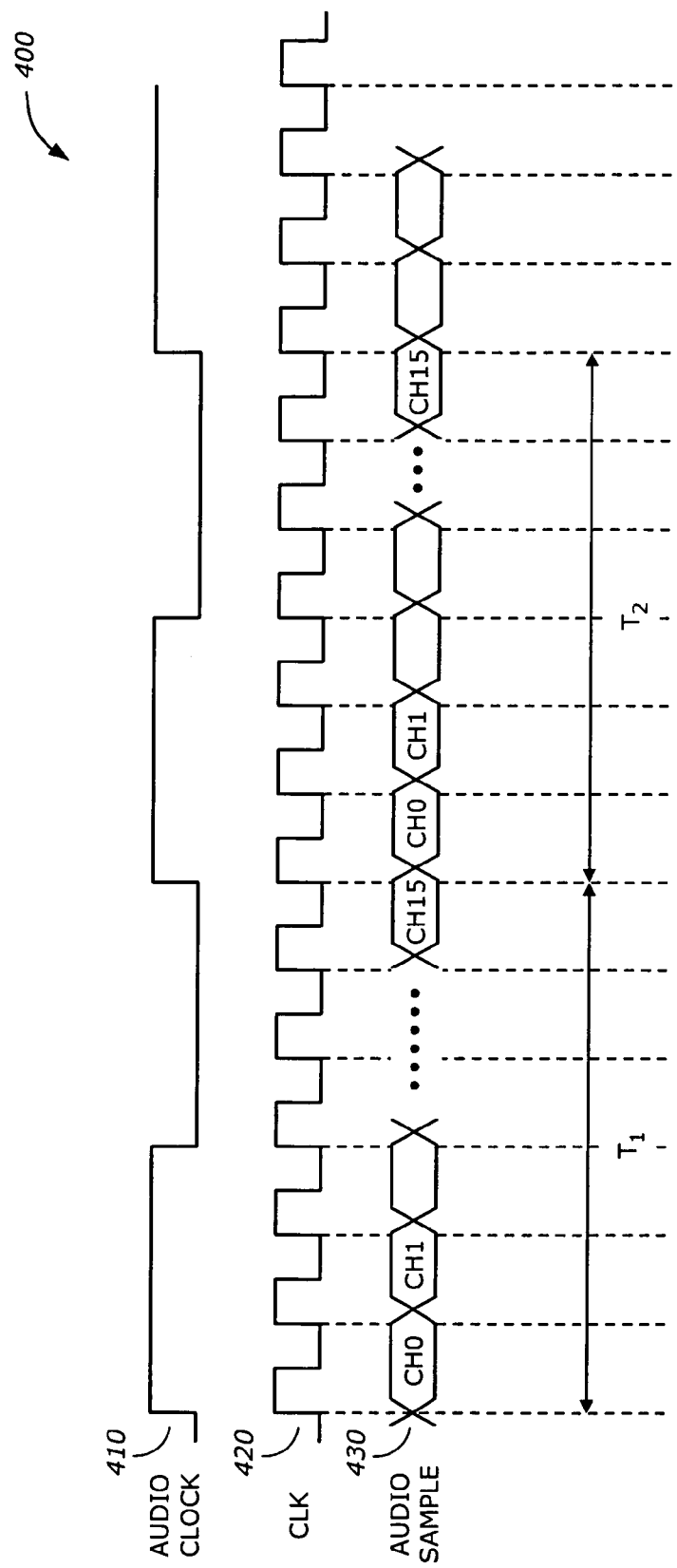
FIG. 4 is a timing diagram illustrating the sampling of an audio signal.

Referring to FIG. 4, a timing diagram 400 illustrating the sampling of audio signals is shown. Timing diagram 400 consists of audio clock 410, clock (CLK) 420, and audio sampled data 430.

Audio clock 410 is a clock that correspond to the audio sampling rate of 48 KHz which results in a sampling period of approximately 20 microseconds. In one embodiment, during each sampling period, 16 samples from 16 audio channels are received from the serial AES input ports and stored in the DRAM banks in recording mode. During the same sample period, the playback of the digital audio is done by reading the data stored in the DRAM banks and sending it to the serial AES output ports.

CLK 420 indicates the separation of 16 channels during each audio clock period. Audio sampled data 430 show the series of sampled audio data. Each of the sampled data corresponds to an audio sample at each channel. The number of samples obtained at each time interval depends on the number of selected channels. In one embodiment, the number of selected channels is 16. For the embodiment shown in FIG. 4, during time interval T1, 16 samples from 16 channels, one from each channel, are obtained. Thereafter, the next 16 samples from 16 channels obtained during time interval T2.

Figure 5:
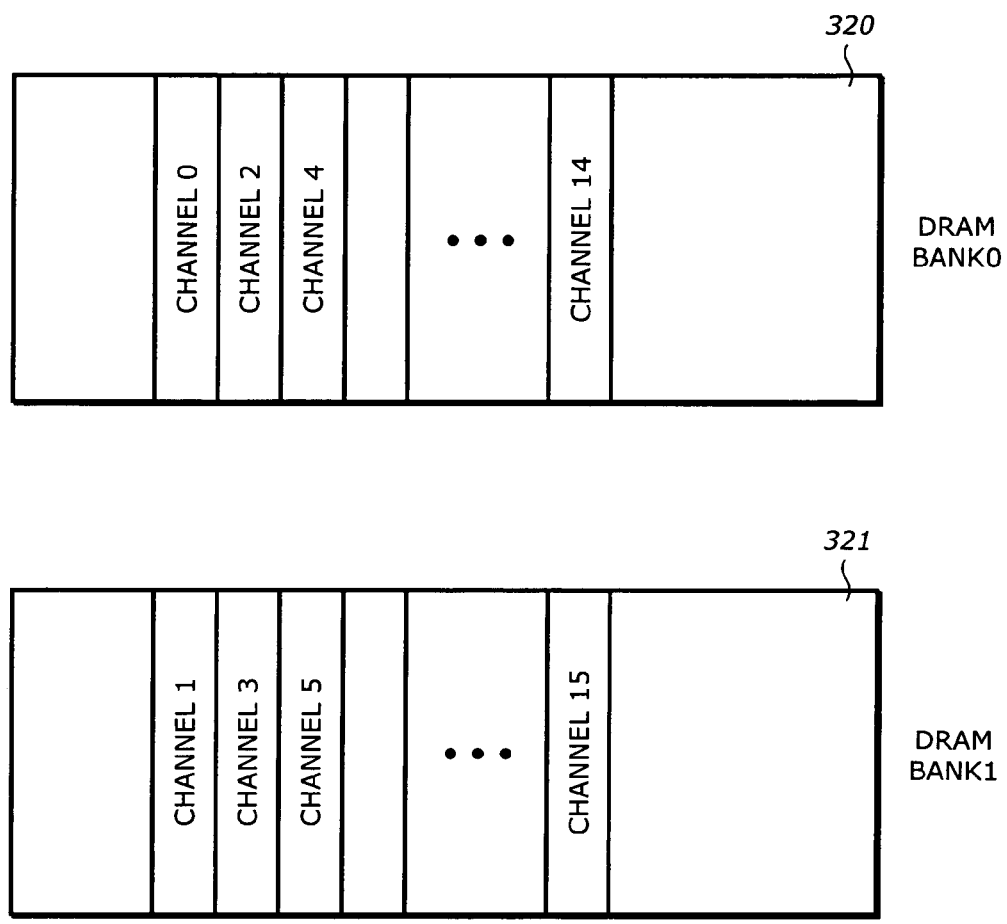
FIG. 5 is a diagram illustrating one embodiment of the allocation of sampled audio data stored in the memory banks.

Referring to FIG. 5, a diagram showing the allocation of audio sampled data in the two memory banks is shown. DRAM BANK 0 is configured to store audio sampled data from channels 0, 2, 4, . . . 14 (the even channels). DRAM BANK 1 is configured to store audio sampled data from channels 1, 3, 5, . . . 15 (the odd channels).

This allocation scheme can be extended to more than two memory banks. The objective is to distribute equally the storage of all audio channels over the entire memory banks so that the access of all 16 channels is not concentrated into one or a few memory banks. With this equal allocation, there is less chance for the SCSI controller and the DSP to access to the same memory bank at the same time. Even when they do, one processor does not have to wait for too long for its turn to access memory. The result is that audio sampled data are written into or read out of the memory banks at a faster rate to accommodate real-time processing.

For example, if there are P memory banks, DRAM BANK0 will store sampled data from channel 0, channel P, channel 2P, channel 3P, etc. DRAM BANK1 will store sampled data from channel 1, channel P+1, channel 2P+1, channel 3P+1, etc. DRAM BANKP will store sampled data from channel P−1, channel 2P−1, channel 3P−1, etc. In general, each DRAM bank should store a subset of audio data which corresponds to a different group of audio channels.

Figure 6:
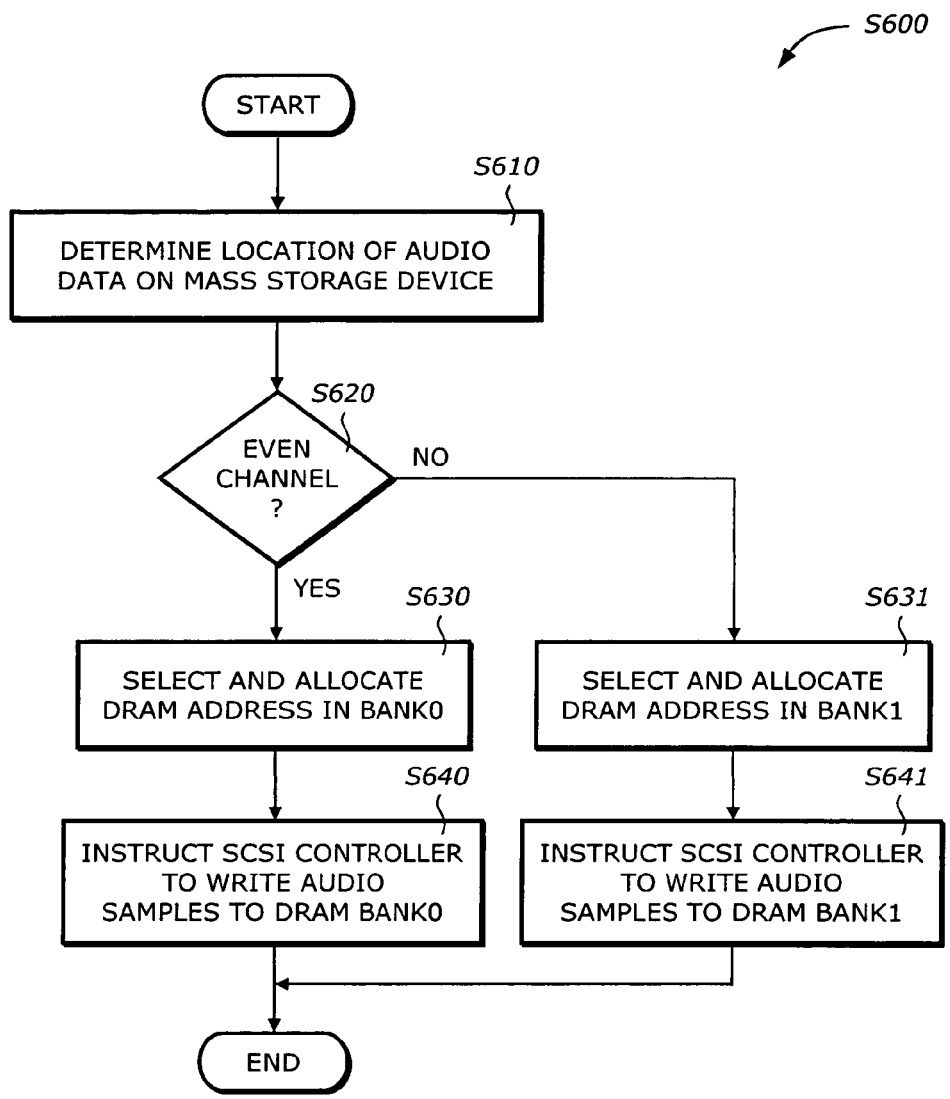
FIG. 6 is a flowchart illustrating a process to read the audio samples and play back the audio data according to one embodiment of the invention.

Referring to FIG. 6, a flowchart showing the process S600 to read the audio samples from mass storage and playback the audio data, is shown. In this embodiment, two memory banks (DRAM BANK0 and DRAM BANK1) are used. Recording is accomplished using the same memory allocation method.

Proceeding from a START state, the process S600 enters step S610. In step S610, the host processor determines the location of the audio data which will be used to instruct the SCSI controller to read the audio sampled data from the hard disk or other mass storage devices. The process S600 next enters the decision step S620 to determine whether the channel number is even or odd. If it is determined that the channel number is even, the process S600 enters the step S630 to select and allocate a block of memory in the DRAM BANK0 for storing the sampled data. Thereafter, the process S600 enters the step S640 to write the audio sampled data into the DRAM BANK0. The process is then terminated.

If it is determined that the channel number is odd, the process S600 enters the step S631 to select the DRAM BANK1 for storing the sampled data. Then in step S641, the audio sampled data is written into DRAM BANK1. The process is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system having first and second buses for processing real-time audio data from a plurality of audio channels, the system comprising:
   a first processor and a second processor coupled to said first and second busses, respectively;
   a plurality of memory banks of semiconductor memory devices coupled to said first and second buses for storing said audio data, said plurality of memory banks being accessible to the first and second processors for operations selected from the group comprising read and write operations, said plurality of memory banks storing subsets of audio data in equal allocation, said subsets corresponding to equally distributed groups of audio channels; and
   a plurality of selectors coupled said first and second buses to select said memory banks for access by one of said first and second processors.

2. The system of claim 1 wherein the plurality of selectors include a plurality of address multiplexers and data transceivers.

3. The system of claim 1 wherein one subset of said audio data corresponds to even-numbered audio channels and one other subset or said audio data corresponds to odd-numbered audio channels.

4. The system of claim 1, wherein the memory banks include dynamic random access memories.

5. The system of claim 1, wherein the subsets are stored in the memory banks in an interleaving manner.

6. The system of claim 1, wherein subsets of audio data are stored in one of the memory banks and stored audio data is read from a second memory bank of the memory banks.

7. The system of claim 1, wherein the first processor performs a read operation on a first memory bank of the plurality of memory banks and the second processor performs a write operation on a second memory bank of the plurality of memory banks.

8. A method for allocating real-time audio data from a plurality of audio channels in a system having a first processor and a second processor, the method comprising:
   providing a plurality of memory banks of semiconductor memory devices, each memory bank being accessible to the first and second processors for operations selected from the group comprising read and write operations; and
   storing subsets of said audio data in the plurality of memory banks in equal allocation, the subsets corresponding to equally distributed groups of audio channels.

9. The method of claim 8, further comprising selecting said memory banks for access by one of the first and second processors.

10. The method of claim 8 wherein one subset of said audio data corresponds to even-numbered audio channels and one other subset of said audio data corresponds to odd-numbered audio channels.

11. The method of claim 8, wherein storing further comprises interleaving the subsets of data.

12. The method of claim 8, wherein storing comprises storing one of the subsets of audio data in one of the memory banks, said method further comprising reading stored audio data from a second of the memory banks.

13. The method of claim 8, wherein the first processor performs a read operation on a first memory bank of the plurality of memory banks and the second processor performs a write operation on a second memory bank of the plurality of memory banks.

* * * * *